United States Patent
Sercel et al.

(10) Patent No.: US 8,633,420 B2
(45) Date of Patent: Jan. 21, 2014

(54) LASER MACHINING SYSTEMS AND METHODS WITH DEBRIS EXTRACTION

(75) Inventors: Jeffrey P. Sercel, Hollis, NH (US); Joshua H. Freed, Deerfield, NH (US); Terrence A. Murphy, Jr., Pembroke, NH (US); Randal R. Hill, Nashua, NH (US); Michael Von Dadelszen, Merrimack, NH (US)

(73) Assignee: IPG Microsystems LLC, Manchester, NH (US)

( * ) Notice: Subject to any disclaimer, the term of this patent is extended or adjusted under 35 U.S.C. 154(b) by 1001 days.

(21) Appl. No.: 12/576,963

(22) Filed: Oct. 9, 2009

(65) Prior Publication Data
US 2010/0089880 A1    Apr. 15, 2010

Related U.S. Application Data

(60) Provisional application No. 61/104,435, filed on Oct. 10, 2008.

(51) Int. Cl.
*B23K 26/14* (2006.01)
(52) U.S. Cl.
USPC ................................. 219/121.67; 219/121.68
(58) Field of Classification Search
CPC .... B23K 26/08; B23K 26/0807; B23K 26/10; B23K 26/103; B23K 26/1405; B23K 26/16
USPC ............. 219/121.67, 121.68, 121.69, 121.33, 219/121.51, 121.55, 121.72, 121.75, 121.73
See application file for complete search history.

(56) References Cited

U.S. PATENT DOCUMENTS

| | | | |
|---|---|---|---|
| 5,504,407 A | 4/1996 | Wakui et al. | |
| 5,739,502 A | 4/1998 | Anderson et al. | |
| 5,854,460 A | 12/1998 | Graf et al. | |
| 6,008,943 A | 12/1999 | Metelitsa | |
| 6,028,376 A | 2/2000 | Osanai et al. | |
| 6,087,625 A | 7/2000 | Iso | |
| 6,396,566 B2 | 5/2002 | Ebinuma et al. | |
| 6,430,465 B2 * | 8/2002 | Cutler | 700/193 |

(Continued)

FOREIGN PATENT DOCUMENTS

| | | |
|---|---|---|
| CN | 101253018 A | 8/2008 |
| CN | 201105361 Y | 8/2008 |

(Continued)

OTHER PUBLICATIONS

International Search Report and Written Opinion dated Dec. 10, 2009 issued in related International Patent Application No. PCT/US2009/060182.

(Continued)

*Primary Examiner* — Khiem D Nguyen
(74) *Attorney, Agent, or Firm* — Grossman Tucker Perreault & Pfleger, PLLC

(57) ABSTRACT

Laser machining systems and methods may include debris removal systems to remove debris generated by the machining process and/or outgassing or filtration systems to remove harmful gases and filter and recycle air within the system. The laser machining systems and methods may be used to scribe one or more lines in large flat workpieces such as solar panels. In particular, laser machining systems and methods may be used to scribe lines in thin film photovoltaic (PV) solar panels with accuracy, high speed and reduced cost.

16 Claims, 11 Drawing Sheets

(56) References Cited

U.S. PATENT DOCUMENTS

| | | | |
|---|---|---|---|
| 6,531,867 B1 | 3/2003 | Greene et al. | |
| 6,586,707 B2 * | 7/2003 | Boyle et al. | 219/121.69 |
| 6,774,340 B1 | 8/2004 | Chiba et al. | |
| 6,781,138 B2 | 8/2004 | Novak et al. | |
| 6,909,735 B2 | 6/2005 | Lizotte et al. | |
| 6,917,412 B2 | 7/2005 | Poon et al. | |
| 6,919,530 B2 | 7/2005 | Borgeson et al. | |
| 7,067,763 B2 | 6/2006 | Schramm | |
| 7,321,418 B2 | 1/2008 | Sasaki et al. | |
| 7,324,867 B2 | 1/2008 | Dinauer | |
| 7,363,180 B2 | 4/2008 | Swaringen et al. | |
| 2002/0003616 A1 | 1/2002 | Ebinuma et al. | |
| 2002/0017511 A1 | 2/2002 | Kling | |
| 2002/0056891 A1 | 5/2002 | Wu | |
| 2002/0060210 A1 * | 5/2002 | Terada et al. | 219/121.76 |
| 2003/0075529 A1 | 4/2003 | Mazumder et al. | |
| 2003/0127441 A1 | 7/2003 | Haight et al. | |
| 2004/0238507 A1 | 12/2004 | Schadler | |
| 2005/0194365 A1 | 9/2005 | Li | |
| 2005/0224475 A1 | 10/2005 | Nomaru | |
| 2005/0247683 A1 | 11/2005 | Agarwal et al. | |
| 2005/0274703 A1 | 12/2005 | Kawakita et al. | |
| 2006/0289412 A1 | 12/2006 | Hamada | |
| 2007/0193990 A1 | 8/2007 | Richerzhagen et al. | |
| 2008/0012189 A1 | 1/2008 | Manz | |
| 2008/0067160 A1 | 3/2008 | Suutarinen | |
| 2008/0099452 A1 * | 5/2008 | Akiyama et al. | 219/121.67 |
| 2008/0105295 A1 | 5/2008 | Manz | |
| 2008/0192322 A1 | 8/2008 | Scaggs et al. | |
| 2009/0000108 A1 | 1/2009 | Manz | |
| 2009/0321397 A1 | 12/2009 | Krishnaswami et al. | |

FOREIGN PATENT DOCUMENTS

| | | |
|---|---|---|
| DE | 102007060658 | 7/2009 |
| GB | 2457720 | 8/2009 |
| WO | 2007078512 | 7/2007 |
| WO | 2009030409 | 3/2009 |
| WO | 2009098459 | 8/2009 |
| WO | 2009103946 | 8/2009 |
| WO | 2009103964 | 8/2009 |
| WO | 2009126899 | 10/2009 |

OTHER PUBLICATIONS

International Search Report and Written Opinion dated Dec. 3, 2009 issued in related International Patent Application No. PCT/US2009/060188.

International Search Report and Written Opinion dated Dec. 10, 2009 issued in related International Patent Application No. PCT/US2009/060228.

Photon International, "Focusing on Lasers," Sep. 2009, p. 208.

Schulze, et al., "Laser Direct Machining—Diversity is Key," Mikromaterialbearbeitung, LTJ Mar. 2008, Nr. 2, p. 38-39.

Dunsky, et al., "Scribing thin-film solar panels," (Feb. 2008) available at http:/1205.157.169.116/display_article/318855/39/ARCHI/none/Feat/Scribing-thin-film-solar-panels, retrieved on Sep. 3, 2008 (3 pages).

Dunsky, "Lasers in the solar energy revolution," (Aug. 2007) available at http://www.coherent.com/Downloads/70410-186e-ILS.pdf, retrieved on Sep. 3, 2008 (3 pages).

International Search Report and Written Opinion dated Mar. 31, 2010 issued in related International Patent Application No. PCT/US2009/060153.

Westin, "Optimisation of Laser Scribing of Back Contact for Pholovoltaic Modules," Master of '-44 Science Program. Department of Applied Physics and Mechanicai Engineering Lulea University of Technology. 2005:102 CIV, ISSN: 1402-1617, ISRN; LTU-EX—05/102—SE. (2005).

US Office Action dated Aug. 9, 2012 received in related U.S. Appl. No. 12/576,508.

Chinese Office Action with English language Summary, issued Jun. 18, 2013 in corresponding Chinese Application No. 200980150144.2.

Chinese Office Action with English language Summary, issued Aug. 15, 2013 in corresponding Chinese Application No. 200980150143.8.

* cited by examiner

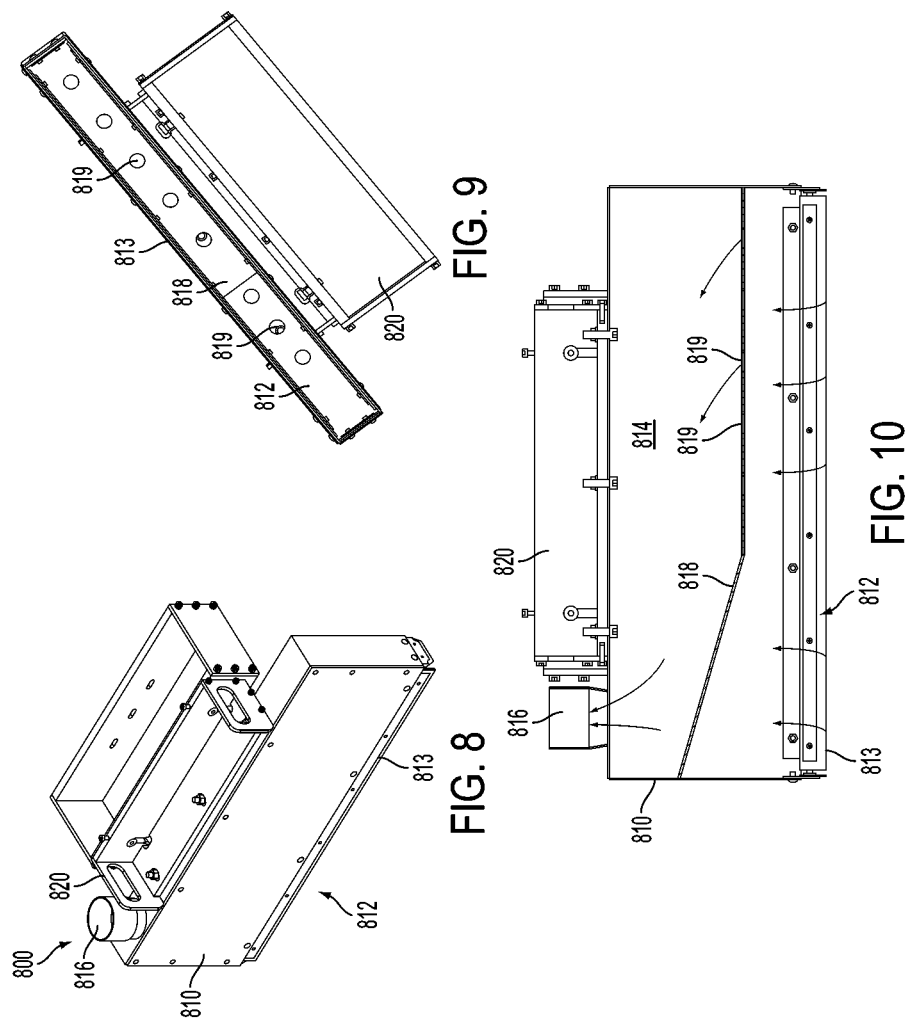

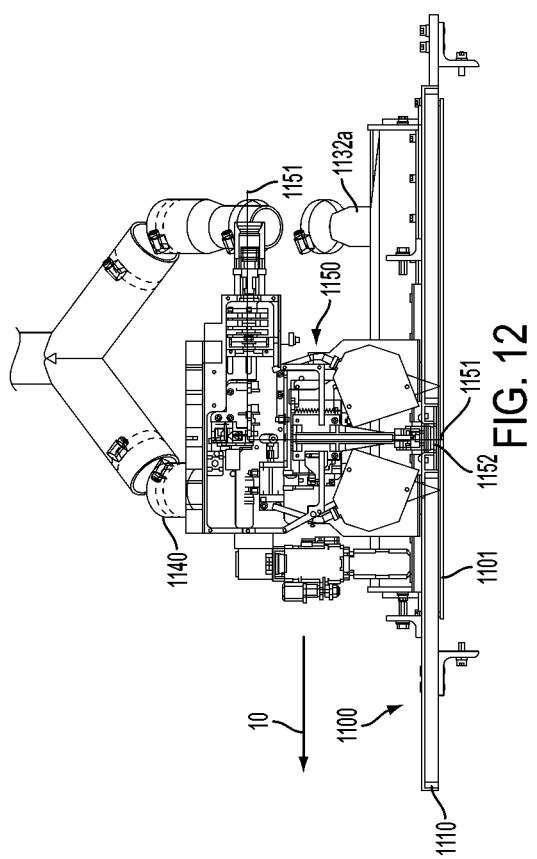
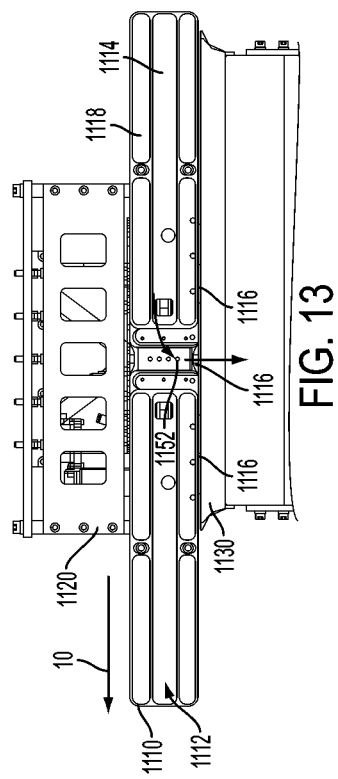

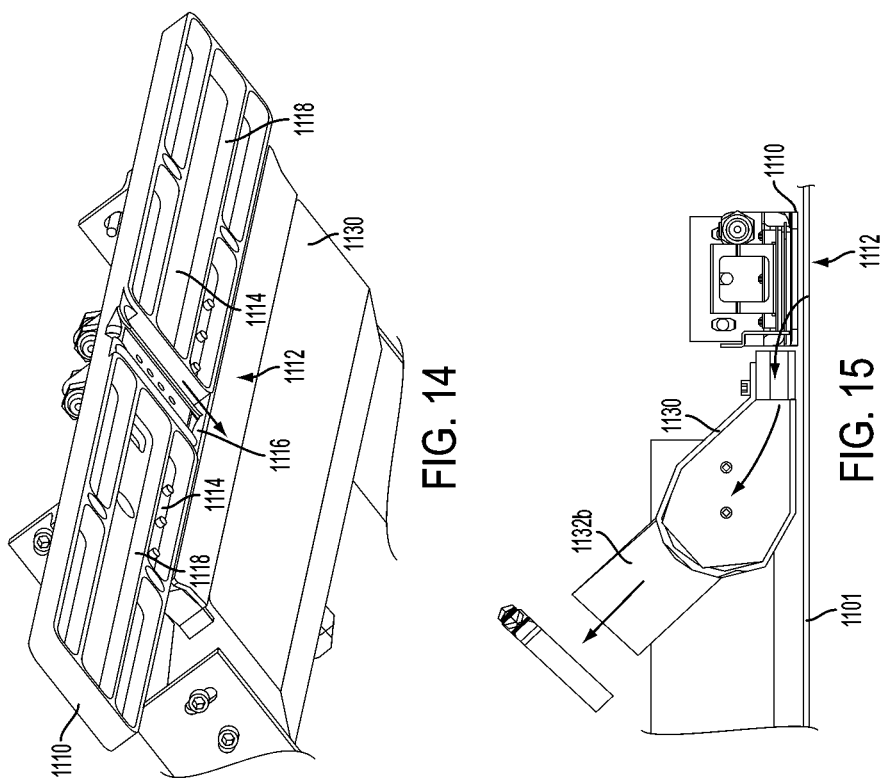

LASER MACHINING SYSTEMS AND METHODS WITH DEBRIS EXTRACTION

CROSS-REFERENCE TO RELATED APPLICATION

The present application claims the benefit of U.S. Provisional Patent Application Ser. No. 61/104,435, filed Oct. 10, 2008, which is fully incorporated herein by reference.

TECHNICAL FIELD

The present invention relates to machining and more particularly, to laser machining systems and methods with debris extraction.

BACKGROUND INFORMATION

Laser machining systems and methods are commonly used to machine various types of materials and structures. Such laser machining systems and methods may provide a number of advantages including lower manufacturing costs, increased throughput and production yield, and improved quality. In the area of solar panels, for example, the advantages of laser machining could significantly enhance the efficiency and viability of solar energy technology.

In the manufacture of thin film photovoltaic (PV) solar panels, laser machining techniques may be used to scribe the various thin film layers in a panel to form electrically connected cells. In one type of PV solar panel, three layers are deposited to form the panel and lines are scribed after each new deposition. The area on the panel including these lines is considered a wasted area that does not contribute to solar energy conversion. Thus, the lines should be straight and aligned accurately to minimize this wasted area and to provide the best efficiency. High scribing speeds are also desirable to improve throughput. Providing accurate high speed scribing of thin film PV solar panels (and other similar structures) presents a number of unique challenges.

In particular, the laser machining of scribe lines presents environmental challenges. The laser ablation of certain materials used in these solar panels may generate harmful gases. For example, cadmium telluride (CdTe) is often used as an active conductive layer in thin film PV solar panels, and the ablation of CdTe produces toxic gases. Existing laser machining systems may not effectively handle these harmful gases in a safe and energy efficient manner. Debris removal may be difficult when a moving optical head is used for laser machining and particularly when the debris is generated on the same side of the workpiece as the laser machining and moving optical head.

BRIEF DESCRIPTION OF THE DRAWINGS

These and other features and advantages will be better understood by reading the following detailed description, taken together with the drawings wherein:

FIG. 8 is a perspective view of an embodiment of a debris collection hood for use in a debris extraction system.

FIG. 9 is a bottom view of the debris collection hood shown in FIG. 8.

FIG. 10 is a cross-sectional view of the debris collection hood shown in FIG. 8.

FIG. 12 is a cross-sectional view of the debris collection hood and optical head shown in FIG. 11.

FIG. 13 is a bottom view of the debris collection hood and optical head shown in FIG. 11.

FIG. 14 is a bottom perspective view of the debris collection hood shown in FIG. 11.

FIG. 15 is a side cross-sectional view of the debris collection hood shown in FIG. 11.

DETAILED DESCRIPTION

Figure 1:
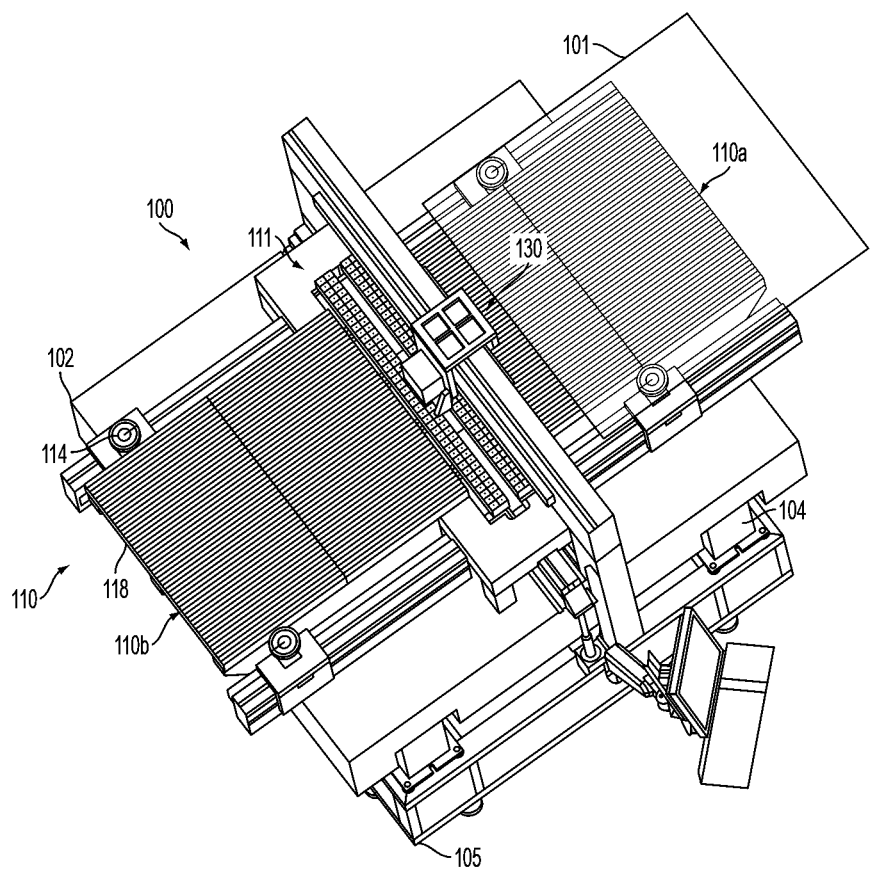
FIG. 1 is a top perspective view of a laser machining system, consistent with an embodiment.
Figure 2:
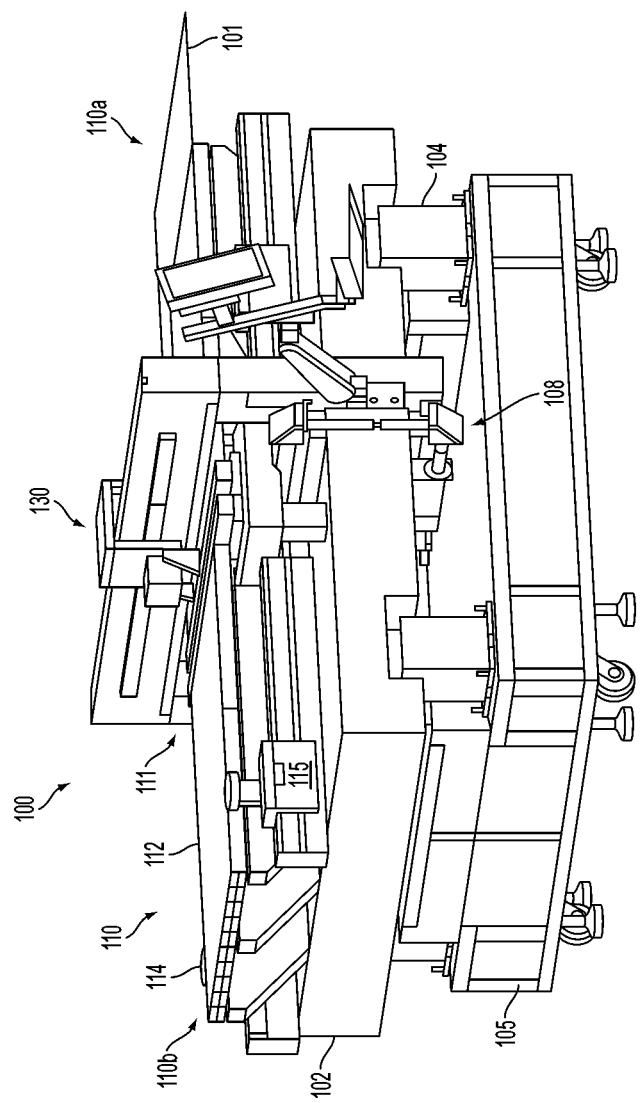
FIG. 2 is a partially cross-sectional perspective view of the laser machining system shown in FIG. 1 taken along an X axis.
Figure 3:
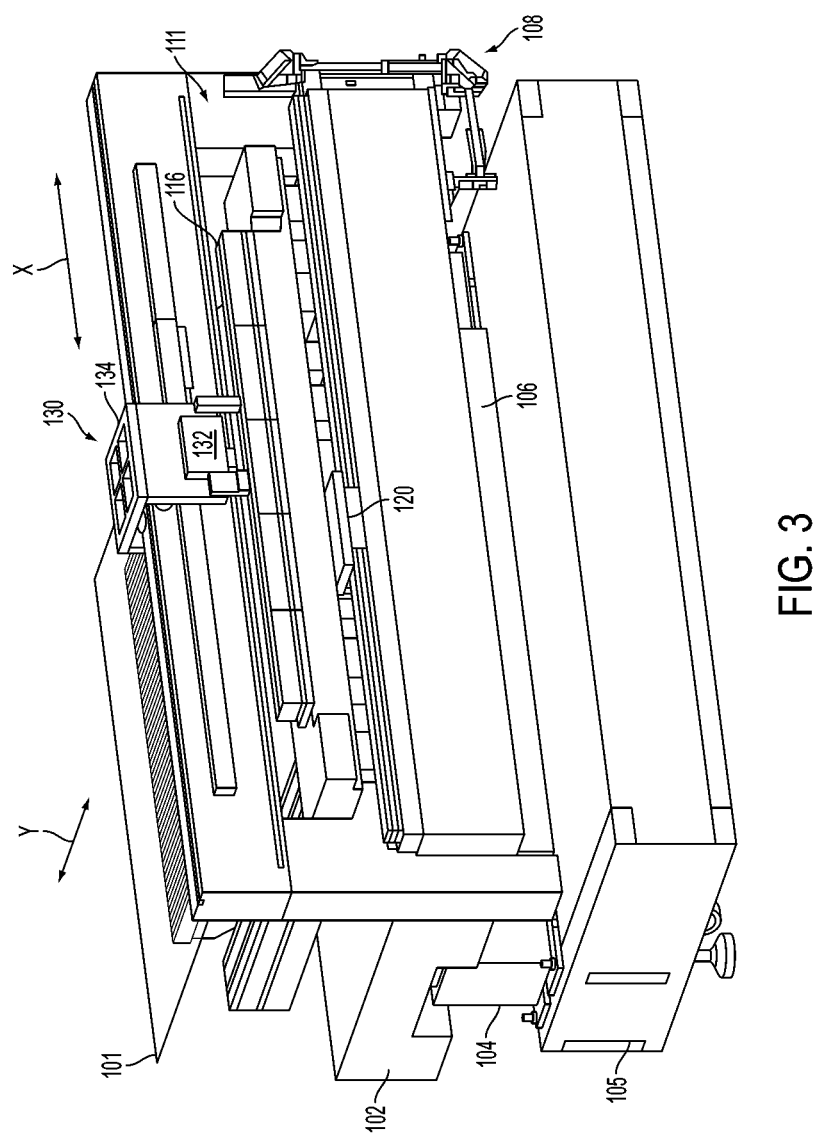
FIG. 3 is a partially cross-sectional perspective view of the laser machining system shown in FIG. 1 taken along a Z axis.
Figure 4:
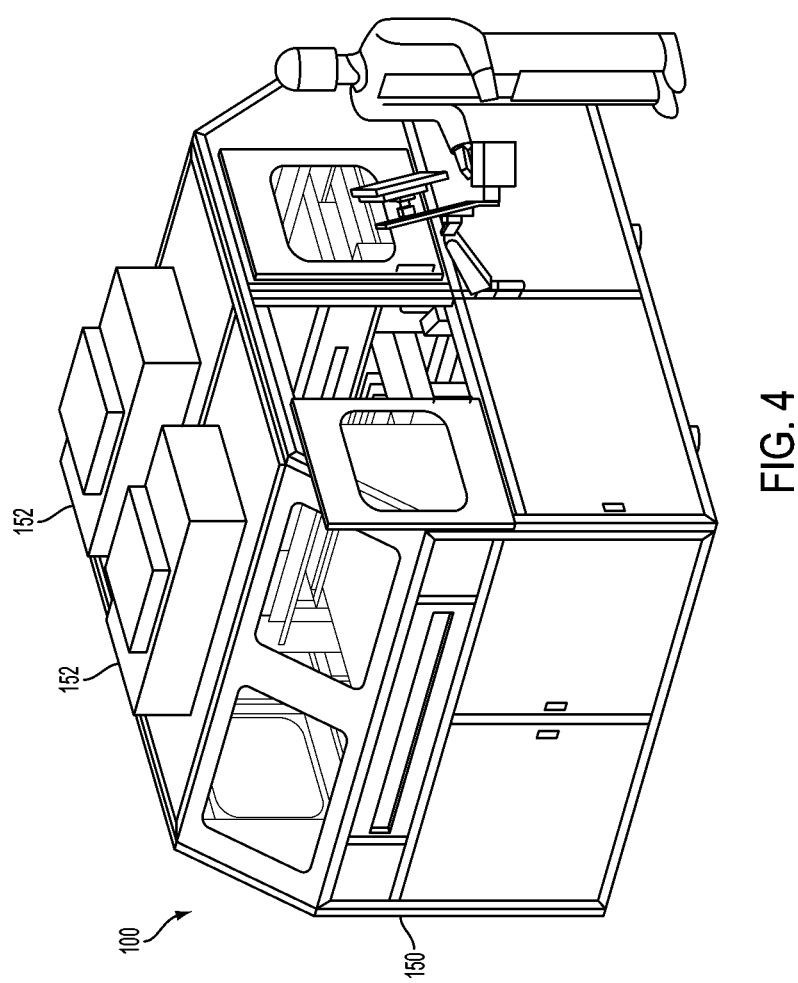
FIG. 4 is a perspective view of the laser machining system shown in FIG. 2 enclosed within an enclosure.

Laser machining systems and methods, consistent with various embodiments described herein, may include debris removal systems to remove debris generated by the machining process and/or outgassing or filtration systems to remove harmful gases and filter and recycle air within the system. The laser machining systems and methods may be used to scribe one or more lines in large flat workpieces such as solar panels. In particular, laser machining systems and methods may be used to scribe lines in thin film photovoltaic (PV) solar panels with accuracy, high speed and reduced cost. Various embodiments of such laser machining systems and methods are described in greater detail below.

As used herein, "machining" refers to any act of using laser energy to alter a workpiece and "scribing" refers to the act of machining a workpiece while the workpiece is moved linearly relative to the laser. Machining may include, without limitation, laser ablation scribing where the laser energy causes the material of the workpiece to ablate, laser recrystallization scribing where the laser energy causes the material of the workpiece to melt and recrystallize, and laser stealth scribing where the laser energy focused internally in the workpiece causes the workpiece to crack internally. As used herein, "flat" means having little curvature but not necessarily planar. As used herein, terms such as "substantially," "about," and "approximately" mean within acceptable tolerances. Various components of the laser machining systems described herein may also be used in systems for machining workpieces having other shapes.

Referring to FIGS. 1-4, one embodiment of a laser machining system 100 is shown and described, which may include a debris extraction system. The laser machining system 100 may include a base 102, such as a granite base, which is supported by a passive vibration isolation system 104. The base 102 may support and provide stability for various components of the laser machining system 100, such as a part handling system, optical heads, motion stages, and motion control systems, as described in greater detail below. The passive vibration isolation system 104 may include four passive isolators at each corner of the base 102 to isolate the laser machining system 100 from vibrations that may travel along the floor. In the illustrated embodiment, the isolators are positioned between the base 102 and a frame 105.

The laser machining system 100 may include a part handling system 110 for supporting a part or workpiece 101 and one or more laser scanning stages 120 supporting one or more optical heads (not shown) that direct one or more laser beams at the workpiece 101. The part handling system 110 may include an infeed section 110a and an outfeed section 110b on opposite sides of a process section 111. The part handling system 110 provides a workpiece support surface 112 for supporting the workpiece 101 and includes a motion control system for controlling motion of the workpiece along a workpiece axis (e.g., Y axis), for example, to index the workpiece 101 through the process section 111. In particular, the infeed section 110a may include an infeed conveyor and the outfeed section 110b may include an outfeed conveyor. The infeed section 110a moves the workpiece 101 into the process section 111 and the outfeed section 110b moves the workpiece 101 out of the process section 111.

In one embodiment, the part handling system 110 and workpiece support surface 112 may be capable of handling and supporting large panels (e.g., 1 m or greater across), such as the type used in thin film solar panels. One embodiment of the part handling system 110 may include one or more vacuum pucks or grippers 114 to hold the workpiece 101 (e.g., large glass panels of a solar panel) and positioning stage(s) to move the grippers 114. One or more of the vacuum grippers 114 may be mounted on an air bearing carriage 115 and may be independently controlled by an air bearing system to allow rotational control of the workpiece 101 for precision alignment. A stationary vacuum puck 116 may also hold the workpiece 101 in position during scribing in the process section 111. An air bearing conveyor 118 may also be used to provide high speed indexing of the workpiece 101 during processing.

In the process section 111, the laser scanning stage(s) 120 may be coupled to a laser scanning stage motion control system for moving the laser scanning stage(s) 120 linearly along one or more scanning axes (e.g., X axis). The scanning stage 120 (and optical head) may be positioned below the workpiece support surface 112 (and thus under the workpiece 101) such that the optical head directs the beam(s) upwardly at the workpiece 101 while the scanning stage 120 moves linearly along the scanning axis. The scanning stage 120 and motion control system may include a high speed precision air bearing system, for example, capable of speeds up to about 2.5 m/sec or greater. A force cancellation technique or mechanism may be used to cancel or minimize reaction forces caused by the movement of the scanning stage(s) 120 and optical head(s). Examples of force cancellation techniques and mechanisms that may be used are described in greater detail in U.S. patent application Ser. No. 12/576,497 entitled LASER MACHINING SYSTEMS AND METHODS WITH MOVING LASER SCANNING STAGE(S) PROVIDING FORCE CANCELLATION, which is filed concurrently herewith and fully incorporated herein by reference.

The laser machining system 100 also includes one or more laser sources 106 that generate one or more raw laser beams and a beam delivery system that modifies and routes laser beam(s) to the workpiece 101. The laser wavelength may be selected based on the layer and type of material to be scribed and may include, for example, wavelengths of 1064 nm, 352 nm, 355 nm, or 266 nm. The laser source(s) 106 may be located below the base 102 and may be mounted on a fast access service module to minimize down time during service intervals. The beam delivery system may modify the beam by controlling the shape, size, uniformity and/or strength of the beam that is routed to the workpiece 101.

The beam delivery system may include a stationary segment 108 located on the frame 105 and/or base 102 and a movable segment located on or in the moveable optical head (not shown) on the laser scanning stage(s) 120. The stationary segment 108 of the beam delivery system may include, for example, a series of lenses, mirrors and/or reflectors, used to direct the laser beam(s) from the laser source 106 into the movable segment of the beam delivery system. The minors or reflectors in the stationary segment 108 of the beam delivery system may be fast steering mirrors that are capable of changing the direction of the beam(s) directed into the optical heads, which may be used for beam tracking and/or for locking the laser to improve pointing stability.

The stationary segment 108 of the beam delivery system may also include a beam expander for expanding the beam and a power meter for measuring a power of the beam. The beam expander can change both the shape and the size of the beam and may include an arrangement of spherical lenses that allow for independent adjustment of both beam expansion ratio and divergence compensation. The power meter may be retractable, for example, using a pneumatic actuator, such that the power meter may be moved into the path of the beam to measure power readings. A retractable beam stop may also be moved into and out of the beam path (e.g., using pneumatic actuator). The retractable beam stop may include a mirror that redirects the beam into a water cooled beam dump to prevent the beam from passing into the optical head.

The moveable segment of the beam delivery system receives a laser beam, modifies the laser beam, and directs one or more modified laser beams to the workpiece. In one embodiment, the beam delivery system splits a beam into multiple beamlets to scribe multiple lines simultaneously to get a higher throughput and uses homogenizers and/or imaging optics to make the beam less sensitive to angular pointing instability and to improve accuracy. Examples of the beam delivery systems that may be used are described in greater detail in U.S. patent application Ser. No. 12/576,504 entitled LASER MACHINING SYSTEMS AND METHODS WITH MULTIPLE BEAMLET LASER BEAM DELIVERY SYSTEM, which is filed concurrently herewith and fully incorporated herein by reference.

The laser machining system may also include a debris control system 130 for collecting and removing debris generated by machining the workpiece 101. In particular, the debris control system 130 may remove debris generated from scribing toxic materials, such as GaAs, and other materials used in thin film solar panels. The debris control system 130 may include a movable debris collection module or head 132 mounted on a debris control motion stage 134 above the workpiece support surface for linear movement with the laser scanning stage 120 and optical head. The debris control motion stage 134 may be controlled by a motion control system and slaved to the motion of the scanning stage 120. In particular, the debris control motion stage 134 may be an air bearing linear motor driven stage.

The laser machining system 100 may further include air filtration systems and outgassing systems to filter and recycle air within the enclosure. An enclosure 150 may be located around the laser machining system 100 and air filtration systems 152 may be located on the enclosure 150. The air filtration systems 152 filter the air to remove harmful gases and direct the filtered air back into the processing area within the enclosure 150. Embodiments of debris extraction systems are described in greater detail below.

The laser machining system 100 may also include tracking systems and/or vision inspection systems (not shown) for precision alignment of the workpiece prior to scribing and/or for tracking and/or inspection during and/or after scribing. One or more sensors or inspection cameras may be mounted on the debris control motion stage 134 or another motion stage that moves with the laser scanning stage 120. The laser machining system may also include computerized control systems including control software that integrates the laser, motion control, digital input/output, tracking, and optional machine vision inspection. Examples of tracking and vision correction systems and methods that may be used are described in greater detail in U.S. patent application Ser. No. 12/576,508 entitled LASER MACHINING SYSTEMS AND METHODS WITH VISION CORRECTION AND/OR TRACKING, which is filed concurrently herewith and fully incorporated herein by reference.

Figure 5A:
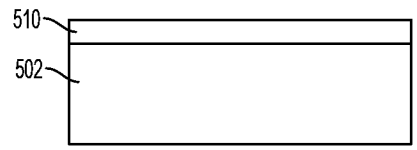
FIGS. 5A-5F are side schematic views illustrating the formation of lines in different layers of a thin film photovoltaic solar panel, consistent with an embodiment.
Figure 5B:
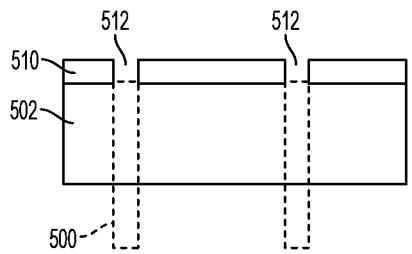

The laser machining system 100 may be used to scribe lines in large panels such as solar panels. Referring to FIGS. 5A-5F, one method of scribing lines in a thin film photovoltaic (PV) solar panel is described in greater detail. A first (P1) layer of conductive material 510 may be deposited on a substrate 502, such as glass or polyethylene terephthalate (PET) (FIG. 5A). The first layer 510 of conductive material may include a transparent conductive oxide including, but not limited to, indium tin oxide (ITO), indium zinc oxide (IZO), tin oxide (SnO) or zinc oxide (ZnO). The first layer 510 may then be scribed by directing one or more laser beams 500 through the substrate 502 to the first layer 510 to ablate a portion of the first layer 510 and form one or more scribe P1 scribe lines 512 (FIG. 5B). The scribe lines 512 may be spaced, for example, about 5-10 mm apart. The laser beam(s) 500 may have a wavelength (e.g., 1064 nm) and energy density sufficient to ablate the P1 layer 510 without damaging the substrate 502.

Figure 5C:
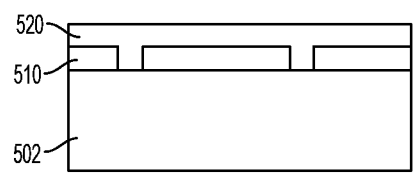
Figure 5D:
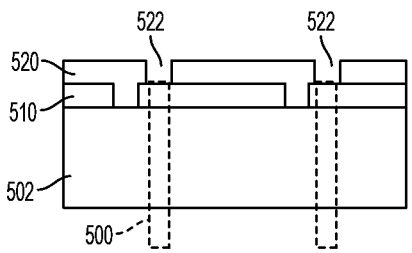

A second (P2) layer 520 of an active semiconductor material may then be deposited on the first layer 510 and within the P1 scribe lines 512 formed in the first layer 510 (FIG. 5C). The semiconductor material of the second layer 520 may include, without limitation, amorphous silicon (aSi), cadmium telluride (CdTe), copper indium gallium diselenide (CIGS), or copper indium diselenide (CIS). The second layer 520 may then be scribed by directing one or more laser beams 500 through the substrate 502 and the first layer 510 to the second layer 520 to ablate a portion of the second layer 520 and form P2 scribe lines 522 (FIG. 5D). The laser beam(s) 500 may have a wavelength (e.g., 532 nm) and energy density sufficient to ablate the P2 layer 520 without damaging the substrate 502 and the P1 layer 510.

Figure 5E:
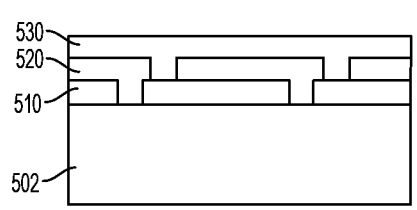
Figure 5F:
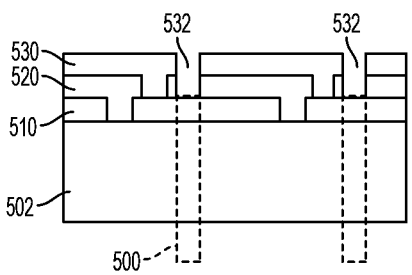

A third (P3) layer 530 of a metal may then be deposited on the second layer 520 and in the P2 scribe lines 522 formed in the second layer 520 (FIG. 5E). The conductive material of the third layer 530 may include a metal including, but not limited to, aluminum (Al), molybdenum, Mo, silver (Ag), or chromium (Cr). The second and third layers 520, 530 may then be scribed by directing one or more laser beams 500 through the substrate 502 to the second layer 520 and third layer 530 to ablate a portion of the second and third layers 520, 530 and form P3 scribe lines 532 (FIG. 5F). The laser beam(s) 500 may have a wavelength (e.g., 532 nm) and energy density sufficient to ablate the P2 and P3 layers 520, 530 without damaging the substrate 502 and the P1 layer 510.

The area with the lines 512, 522, 532 scribed in the P1-P3 layers 510, 520, 530 does not contribute toward solar energy conversion and is often referred to as a wasted or dead area. The lines 512, 522, 532 should be scribed and aligned accurately to minimize this dead area and provide the best efficiency of the solar panel. Embodiments of the laser machining system and method described herein are capable of forming the laser beams 500, directing laser beams 500 up through the substrate, and moving or scanning the beams 500 across the substrate to form the scribe lines 512, 522, 532 accurately. Embodiments of the laser machining system and method described herein may also be used to scribe the lines 512, 522, 532 from the top or film side by moving or scanning beams directed at the layers 510, 520, 530. In particular, the debris extraction systems and collection hoods described herein are capable of removing harmful debris and/or fumes that are generated by scribing the layers 510, 520, 530, particularly when using a moving optical head that scans the panel to form the scribe lines.

Figure 6:
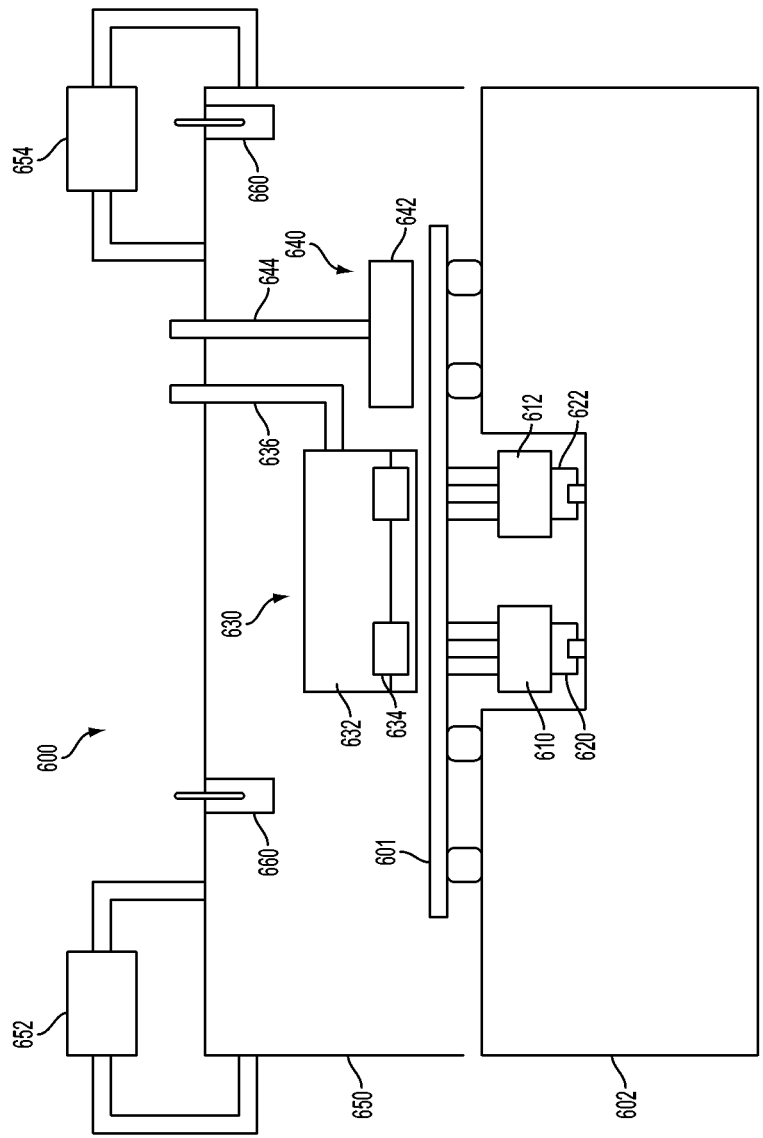
FIG. 6 is a schematic view of debris collection and filtration systems used in a laser machining system, consistent with an embodiment.

Referring to FIG. 6, one embodiment of a laser machining system 600 includes a debris control system 630, a post process outgassing system 640, and/or one or more filtration systems 652, 654. In the illustrated embodiment, the laser machining system includes a base 602 and dual optical heads 610, 612 on dual scanning stages 620, 622 below a workpiece 601, for example, as described above. The debris control system 630, post processing outgassing system 640, filtration system(s) 652, 654 and/or other features shown and described herein may also be used alone or together in other types of laser machining systems.

The debris control system 630 may include a stationary vented enclosure 632 for removing toxic gases from the processing site and one or more moving debris collection heads 634 for collecting debris or effluent generated by the machining process. The debris collection heads 634 may be mounted to motion stages for movement within the enclosure 632 along with the scanning stages 620, 622. The debris collection heads 634 may include, for example, collection hoods, dual collection nozzles, such as vortex nozzles, mounted to the motion stages and coupled to one or more conduits (not shown) for carrying the debris or effluent away from the processing area. The debris control system 630 may also include one or more filters (not shown) for filtering the air carrying the debris or effluent. The stationary vented enclosure 632 may be coupled to a conduit 636 for carrying air with toxic gases from the processing site, for example, to a filter for filtering the air.

The post processing outgassing system 640 may include a stationary ventilation chamber 642 coupled to a conduit 644 for removing toxic gases after scribing has been completed and before a user removes the workpiece. The post processing outgassing system 640 may also include a filter (not shown) that filters the air including the toxic gases and recycles the filtered air. The ventilation chamber 642 may be separate from the vented enclosure 632 of the debris control system 630 for separately removing toxic gases after processing. Alternatively, the ventilation chamber 642 of the post processing outgas sing system 640 may be an extension of the vented enclosure 632. Both the vented enclosure 632 and the ventilation chamber 642 may be coupled to the same filter (not shown) for filtering the air including the toxic gases removed from the processing site and for recycling the filtered air.

The laser machining system 600 may be enclosed in an enclosure 650 such as a Class I enclosure. The filtration system(s) 652, 654 may filter and recycle the air in the enclosure 650. The filtration systems 652, 654 may include air filters that are capable of removing the toxic or harmful gases that are generated by the machining process. The laser machining system 600 may thus provide multiple filtration systems for filtering and recycling air. Filtering and recycling the air within the enclosure 650 improves the environmental safety of the system while also minimizing the amount of new air that needs to be pumped into the enclosure 650.

The laser machining system 600 may also include one or more environmental test coupon cartridges 660 for receiving environmental safety test coupons that test the environment within the enclosure 650. The test coupons may indicate the existence of toxic gases within the enclosure 650, which indicates when filters may need to be changed. The test coupon cartridges 660 may be located in various locations to receive test coupons in various key positions inside of the enclosure 650. The test coupon cartridges 660 may also be located on the enclosure 650 or in other locations that provide fast access to the test coupons without having to open the enclosure.

Figure 7:
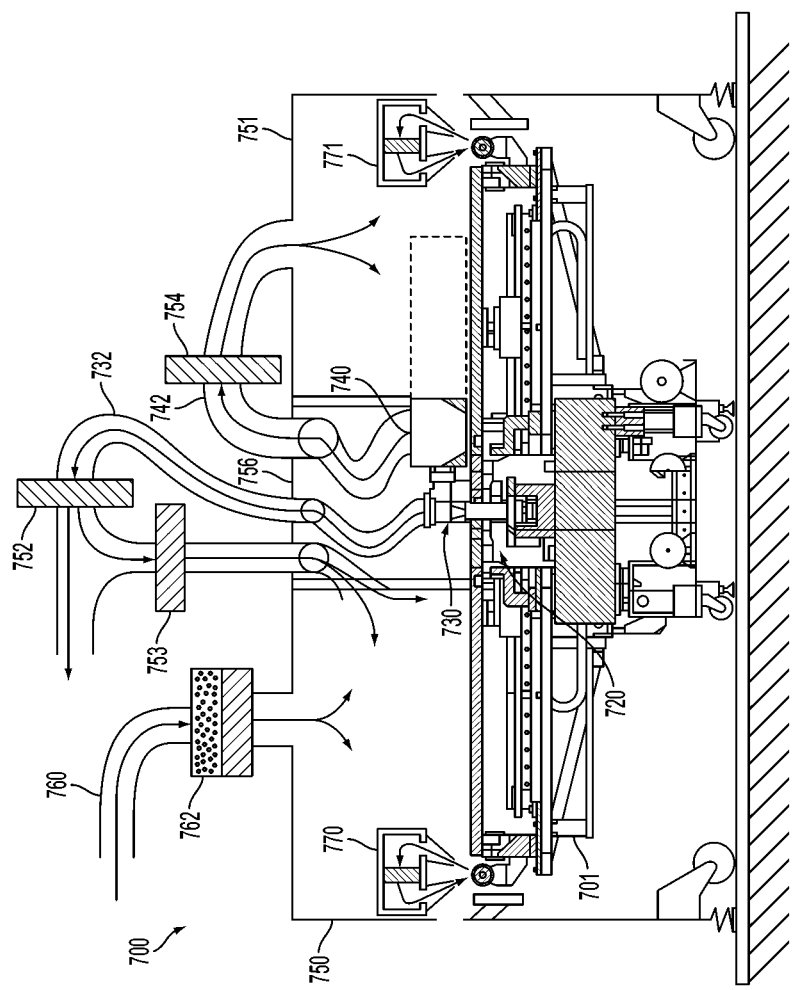
FIG. 7 is a side view of a laser machining system including another embodiment of a debris collection and filtration system.
Figure 11:
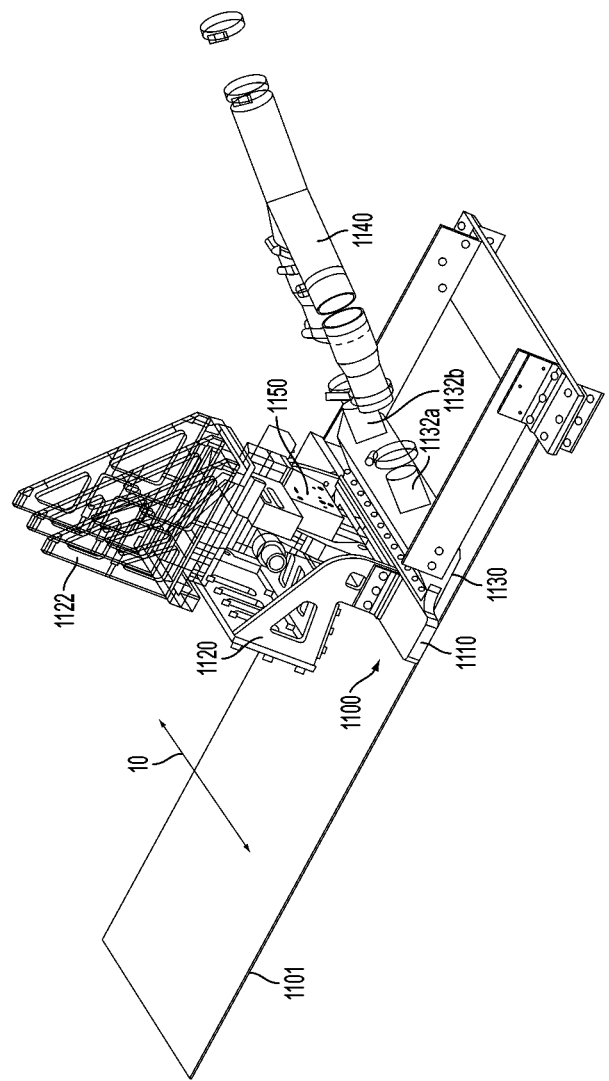
FIG. 11 is a perspective view of another embodiment of a debris collection hood coupled with an optical head for use in a top side laser machining system.

FIG. 7 shows another embodiment of a laser machining system 700 including a debris control system, a post process outgassing system, and/or air filtration/recycling systems. According to this embodiment, a front rolling subframe 750 may be positioned over an infeed section of the laser machining system 700 and a rear rolling subframe 751 may be positioned over an outfeed section. The rolling subframes 750, 751 may be removable for setup and maintenance. A fixed subframe 756 may be positioned over a process section.

A process exhaust module 730 may mounted over the processing area to remove debris and/or fumes generated during processing. In one embodiment, the process exhaust module 730 may include a collection hood mounted on a moving exhaust stage that follows the scanning motion of a scanning stage and optical head 720 located below the processing area. In another embodiment, the process exhaust module 730 may include a fixed collection hood that extends across the width of the processing area opposite the optical head 720. In a further embodiment, the process exhaust module 730 may include a collection hood coupled to an optical head mounted above the processing area such that the process exhaust module 730 moves with the optical head, for example, during top side machining.

A process exhaust conduit 732 may remove the process exhaust for filtering by one or more air filters 752, 753. A portion of the filtered air may be exhausted out and a portion of the filtered air may be recycled.

A post process fume hood 740 may extend along at least a portion of the outfeed section and over the workpiece to remove post process fumes. The post process fume hood 740 may be longer as shown by the broken lines. A post process fume conduit 742 removes the post process gasses for filtering by air filter 754 and then recycles the air. An input air conduit 760 may supply replacement air to the system 700, for example, into the front rolling sub frame 750. A heat exchanger and input air filter 762 may be used to allow temperature control of the internal air.

Workpiece cleaning stations 770, 771 may be located at the beginning of the infeed section and at the end of the outfeed section for cleaning the workpiece (e.g., the glass panel) before processing and after processing. The workpiece cleaning stations 770, 771 may each include an air recycling module.

Referring to FIGS. 8-10, an embodiment of a debris collection hood 800 is described in greater detail. The debris collection hood 800 may include a body portion 810 that extends generally across the processing area of a laser machining system and across the width of the workpiece located in the processing area. A bracket 820 may secure the body portion 810 in a fixed position above the processing area such that an optical head (not shown) scans and processes the workpiece below the collection hood 800. When the optical head scans a laser to scribe one or more top film layers of a glass panel for thin film PV solar panel manufacturing, for example, as described above, the hazardous debris and/or fumes are removed from the top side of the workpiece below the collection hood 800.

The body portion 810 of the collection hood 800 defines an open bottom inlet 812, a hollow cavity 814, and an outlet 816. The collection hood 800 may also include a baffle 818 with holes 819 located inside the cavity 814 of the body portion 810. The baffle 818 may be angled toward the outlet 816 to facilitate uniform air flow from the bottom inlet 812 to the outlet 816 and across the length of the hood 800 regardless of the position of the optical head relative to the workpiece. The collection hood 800 thus ensures complete and uniform debris collection across the workpiece as the optical head scans back and forth.

Rubber flaps or wipers 813 extend around the bottom inlet 812 and may be made of a material that will not damage the top surface of the workpiece. The bottom inlet 812 may be positioned with the wipers 813 as close as possible to a surface of the workpiece being machined (e.g., between hundreds of microns and a few millimeters) such that a small amount of air flow is allowed to sweep the processing area clear of debris while also reducing the total volume of air that needs to be filtered. The body portion 810 may be positioned such that the protective flaps 813 contact the workpiece. The outlet 816 may be coupled to a filtration system via a conduit, for example, as described above. The filtration system causes a vacuum pressure in the collection hood 800 and the collection hood 800 allows debris and/or fumes from a machining process to pass up through the open bottom inlet 812, through the holes 819 in the baffle 818, and through the outlet 816 to a filtration system, as shown by the arrows in FIG. 10.

Referring to FIGS. 11-15, another embodiment of a debris collection assembly 1100 may be coupled to a moving optical head 1150. The debris collection assembly 1100 includes a moving collection hood 1110 that moves with the optical head 1150 along a scanning axis (e.g, in the direction of arrow 10) and across the top surface of the workpiece 1101. The collection hood 1110 and the optical head 1150 may be mounted to a scanning stage (not shown) via brackets 1120, 1122, respectively. This embodiment of the debris collection assembly 1100 thus allows machining and debris removal from the same side of the workpiece 1101, for example, when machining from the top side of the workpiece 1101.

According to this embodiment, the debris collection hood 1110 has a generally flat body portion or plate defining an open bottom inlet 1112. The debris collection hood 1110 may be configured to receive the portion 1152 (e.g., the objective lens module) of the optical head 1150, which directs the laser beam(s) 1151 to the workpiece 1101. The debris collection hood 1110 may thus extend along the scanning axis on each side of the optical head portion 1152 to collect debris and/or fumes when the optical head 1150 is moving in either direction along the scanning axis and the debris collection hood 1110 moves along the workpiece 1101 together with the optical head 1150. The debris collection hood 1110 also defines channels 1114 extending across the open bottom inlet 1112 between walls 1118. The channels 1114 help to reduce the weight of the debris collection hood 1110 that moves with the optical head 1150 and create a uniform vacuum pressure and air film across the bottom inlet 1112 regardless of the position relative to the edge of the workpiece 1101. The debris collection hood 1110 may also provide positive uninterrupted air flow across multiple beams from the optical head 1150.

The debris collection assembly 1100 may also include a stationary manifold vent or duct 1130 in fluid communication with the debris collection hood 1110 as the debris collection hood 1110 slides against the stationary manifold vent or duct 1130 to receive the debris collected by the debris collection hood 1110. The manifold vent or duct 1130 may include one or more outlets 1132a, 1132b coupled to a filtration system via conduits 1140. One or more holes 1116 in a side of the debris collection hood 1110 communicate with holes along a side of the manifold vent or duct 1130 throughout the entire range of movement of the debris collection hood 1110 such that debris and/or fumes pass through the hole(s) 1116 and into the manifold vent or duct 1130, as shown by the arrows in FIGS. 13-15. The debris collection assembly 1100 thus ensures continuous and complete removal of the debris and/or fumes as the optical head 1150 scans the workpiece 1101.

Accordingly, the debris extraction systems and methods, and particularly the debris collection hoods, described herein are capable of removing harmful debris and/or fumes when laser machining large workpieces and without interfering with the machining process.

Consistent with an embodiment, a laser machining system includes a part handling system including a workpiece support surface for supporting a workpiece to be machined and at least one laser source for generating at least one beam. At least one scanning stage is positioned relative to the part handling system for linear movement along a scanning axis, and an optical head is located on the laser scanning stage. The optical head includes a beam delivery system for receiving the beam, modifying the beam and directing the modified beam to a workpiece surface to be machined. The laser machining system further includes a debris control system including a debris collection hood mounted for movement with the optical head for receiving debris and/or fumes as the workpiece is machined, and a conduit for transferring the debris and/or fumes from the debris collection hood.

Consistent with another embodiment, a laser machining debris collection assembly includes an optical head including a beam delivery system for receiving the beam, modifying the beam and directing the modified beam to a workpiece surface to be machined. The optical head is configured for movement along a scanning axis to machine the workpiece. The debris collection assembly further includes a movable debris collection hood coupled to the optical head and movable with the optical head for collecting debris and/or fumes generated as the optical head machines the workpiece. The debris collection hood extends on both sides of the optical head along the scanning axis for collecting debris when the optical head is moving in either direction along the scanning axis. The debris collection assembly further includes a stationary manifold portion in fluid communication with the debris collection hood as the debris collection hood moves along the scanning axis such that debris and/or fumes flow from the debris collection hood into the stationary manifold portion.

Consistent with a further embodiment, laser machining system includes a part handling system including a workpiece support surface for supporting a workpiece to be machined and at least one laser source for generating at least one beam. At least one laser scanning stage is positioned relative to the part handling system for linear movement along a scanning axis, and an optical head is located on the laser scanning stage. The optical head includes a beam delivery system for receiving the beam, modifying the beam and directing the modified beam to a workpiece surface to be machined. The laser machining system further includes a debris control system including a debris collection hood mounted in a processing area opposite the optical head located on the laser scanning stage and configured to receive debris and/or fumes generated by machining a workpiece supported on the workpiece surface. The debris collection head having a length that substantially corresponds to a length of the processing area along the scanning axis. The debris control system further includes a conduit for carrying the gas away from the processing area, and a filter for filtering air including the gas and recycling at least a portion of the air.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser machining system comprising:
 a part handling system including a workpiece support surface for supporting a workpiece to be machined;
 at least one laser source for generating at least one beam;
 at least one laser scanning stage positioned relative to the part handling system for linear movement along a scanning axis;
 an optical head located on the laser scanning stage, the optical head including a beam delivery system for receiving the beam, modifying the beam and directing the modified beam to
 a workpiece surface to be machined;
 a debris control system comprising:
  a debris collection hood mounted for movement with the optical head for receiving debris and/or fumes as the workpiece is machined; and
  a conduit for transferring the debris and/or fumes from the debris collection hood; and
 at least one filter for filtering air including the debris to substantially remove the debris and recycling at least a portion of the air within an enclosure.

2. The laser machining system of claim 1 wherein the debris collection hood is mounted to the scanning stage with the optical head.

3. The laser machining system of claim 2 wherein the debris collection hood extends on each side of the optical head along the scanning axis such that the debris collection hood covers a region of the workpiece after being machined.

4. The laser machining system of claim 3 wherein the debris control system further includes a stationary manifold portion, wherein the debris collection hood fluidly communicates with the stationary manifold portion as the debris collection hood moves along the scanning axis such that debris and/or fumes flow from the debris collection hood into the stationary manifold portion and then into the conduit.

5. The laser machining system of claim 2 wherein the scanning stage, optical head and debris collection hood are mounted above the workpiece support surface such that the optical head is configured for top side machining of the workpiece.

6. The laser machining system of claim 1 wherein the scanning stage and optical head are mounted below the workpiece support surface such that the optical head is configured for bottom side machining of the workpiece, and wherein the debris collection hood is mounted above the workpiece support surface for collecting debris and/or fumes from the top side of the workpiece.

7. The laser machining system of claim 6 further comprising:
- a debris control motion stage for moving in a direction of the laser scanning stage, wherein the debris collection hood is mounted on the debris control motion stage; and
- a motion system for controlling movement of the scanning stage and the debris control stage such that the debris control stage follows the scanning stage.

8. The laser machining system of claim 1 further comprising at least one enclosure for covering the laser machining system.

9. The laser machining system of claim 8 further comprising a test coupon cartridge for receiving a test coupon cartridge within the enclosure.

10. A laser machining debris collection assembly comprising:
- an optical head including a beam delivery system for receiving the beam, modifying the beam and directing the modified beam to a workpiece surface to be machined, wherein the optical head is configured for movement along a scanning axis to machine the workpiece;
- a movable debris collection hood coupled to the optical head and movable with the optical head on the same side of the workpiece for collecting debris and/or fumes generated as the optical head machines the workpiece, the debris collection hood including a base portion extending on both sides of the optical head along the scanning axis, the base portion including bottom inlets extending on both sides of the optical head along the scanning axis for covering a portion of the workpiece on both sides of the optical head and for collecting debris when the optical head is moving in either direction along the scanning axis; and
- a stationary manifold portion in fluid communication with the debris collection hood as the debris collection hood moves along the scanning axis such that debris and/or fumes flow from the debris collection hood into the stationary manifold portion.

11. The laser machining debris collection assembly of claim 10 wherein the base portion defines channels across the bottom inlet.

12. A laser machining system comprising:
- a part handling system including a workpiece support surface for supporting a workpiece to be machined;
- at least one laser source for generating at least one beam; at least one laser scanning stage positioned relative to the part handling system for linear movement along a scanning axis;
- an optical head located on the laser scanning stage, the optical head including a beam delivery system for receiving the beam, modifying the beam and directing the modified beam to a workpiece surface to be machined;
- a debris control system comprising:
    - a debris collection hood mounted in a processing area opposite the optical head located on the laser scanning stage and configured to receive debris and/or fumes generated by machining a workpiece supported on the workpiece surface, the debris collection head having a length that substantially corresponds to a length of the processing area along the scanning axis;
    - a conduit for carrying the gas away from the processing area; and
    - a filter for filtering air including the gas and recycling at least a portion of the air.

13. The laser machining system of claim 12 wherein the scanning stage and optical head are mounted below the workpiece support surface such that the optical head is configured for bottom side machining of the workpiece, and wherein the debris collection hood is mounted above the workpiece support surface for collecting debris and/or fumes from the top side of the workpiece.

14. The laser machining system of claim 12 further comprising a post-process outgassing system comprising:
- a ventilation chamber positioned in a post-processing area to receive gas generated by machining a workpiece supported on the workpiece surface;
- a conduit for carrying the gas away from the processing area;
- a filter for filtering air including the gas and recycling at least a portion of the air.

15. The laser machining system of claim 12 further comprising at least one enclosure for covering the laser machining system.

16. A laser machining system comprising:
- a part handling system including a workpiece support surface for supporting a workpiece to be machined;
- at least one laser source for generating at least one beam;
- at least one laser scanning stage positioned relative to the part handling system for linear movement along a scanning axis;
- an optical head located on the laser scanning stage, the optical head including a beam delivery system for receiving the beam, modifying the beam and directing the modified beam to a workpiece surface to be machined;
- a debris control system comprising:
    - a debris collection hood mounted for movement with the optical head for receiving debris and/or fumes as the workpiece is machined; and
    - a conduit for transferring the debris and/or fumes from the debris collection hood; and
- a post-process outgassing system comprising:
    - a ventilation chamber positioned in a post-processing area to receive gas generated by machining a workpiece supported on the workpiece surface;
    - a conduit for carrying the gas away from the processing area;
    - a filter for filtering air including the gas and recycling at least a portion of the air.

* * * * *